United States Patent [19]

Coon

[11] 4,005,597
[45] Feb. 1, 1977

[54] FILE FORMING PRESS

[76] Inventor: James A. Coon, 929 Drever St., West Sacramento, Calif. 95691

[22] Filed: Nov. 18, 1975

[21] Appl. No.: 632,913

[52] U.S. Cl. .................. 72/380; 72/399; 72/403; 72/466; 72/469

[51] Int. Cl.² ............................ B21D 5/02

[58] Field of Search ............ 72/380, 381, 382, 386, 72/394, 399, 400, 403, 308, 309, 311, 312, 319, 300, 457, 460, 466, 469, 427, 426, 345, 344; 113/113 B

[56] References Cited

UNITED STATES PATENTS

| 58,963 | 10/1866 | Shipton et al. | 72/394 |
| 152,523 | 6/1874 | Secor | 72/309 |
| 545,758 | 9/1895 | Aiken | 72/455 |
| 1,850,679 | 3/1932 | Leis | 72/400 X |
| 1,895,401 | 1/1933 | Simonsen et al. | 72/345 |
| 1,909,930 | 5/1933 | Ridder | 72/381 X |
| 3,505,852 | 4/1970 | Sassak | 72/386 X |

Primary Examiner—James R. Duzan
Attorney, Agent, or Firm—Blair & Brown

[57] ABSTRACT

A press to form files that are made of sheet material, the press being capable of using tools that may be substituted one for another according to the desired shape of the file being made.

8 Claims, 35 Drawing Figures

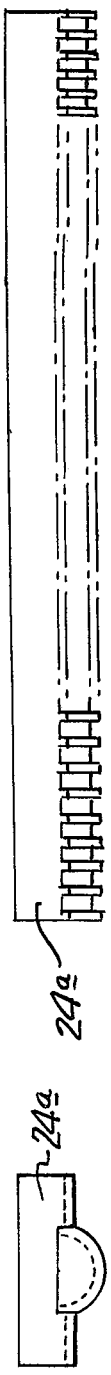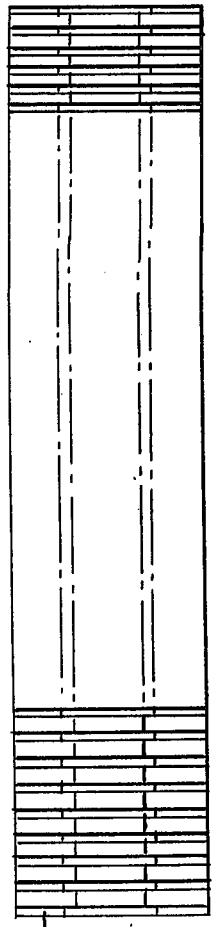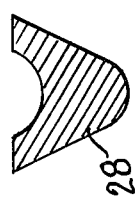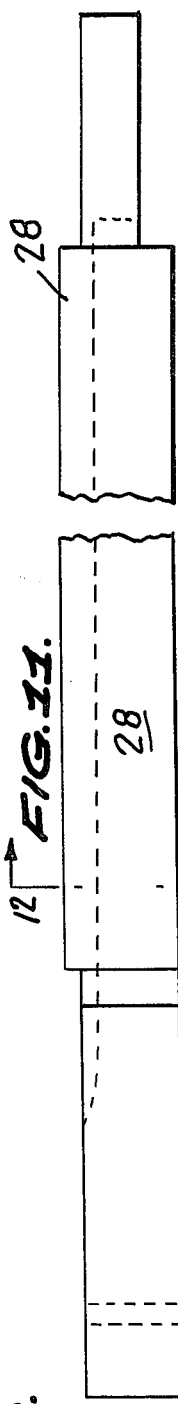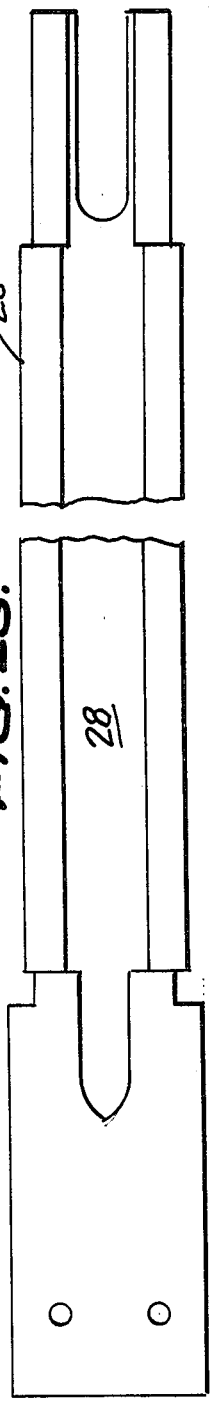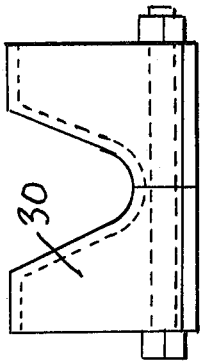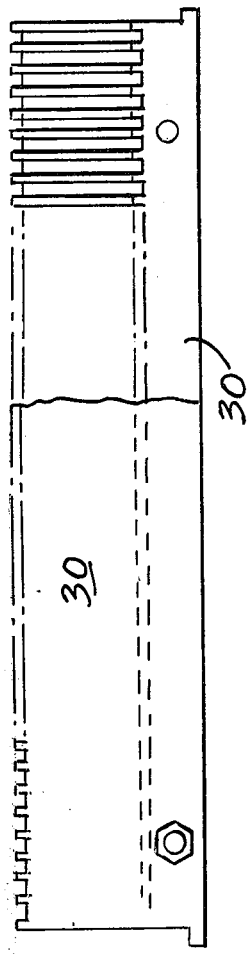

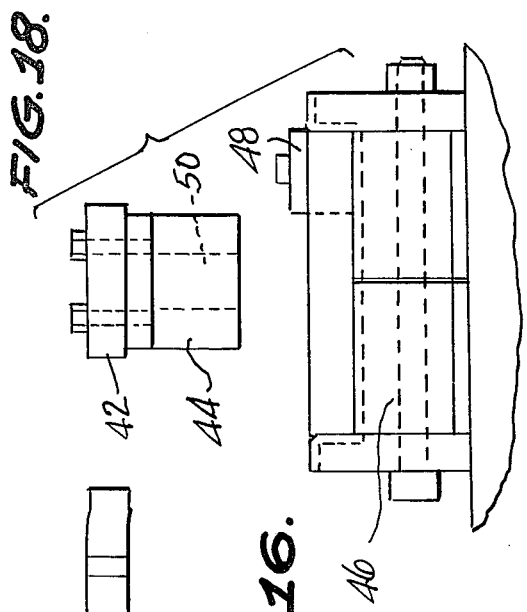
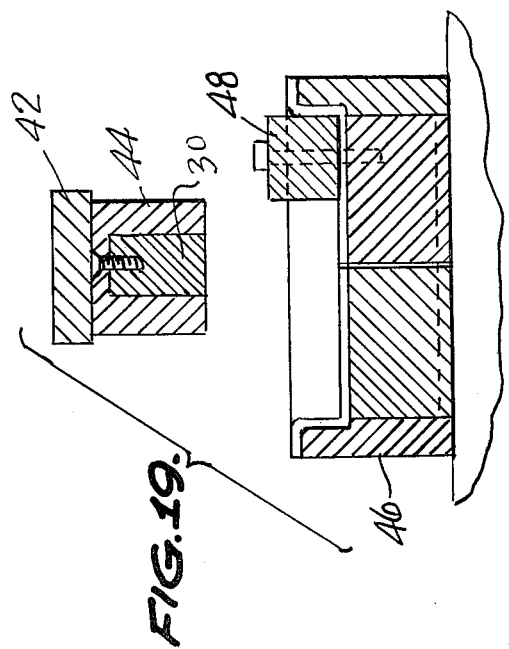
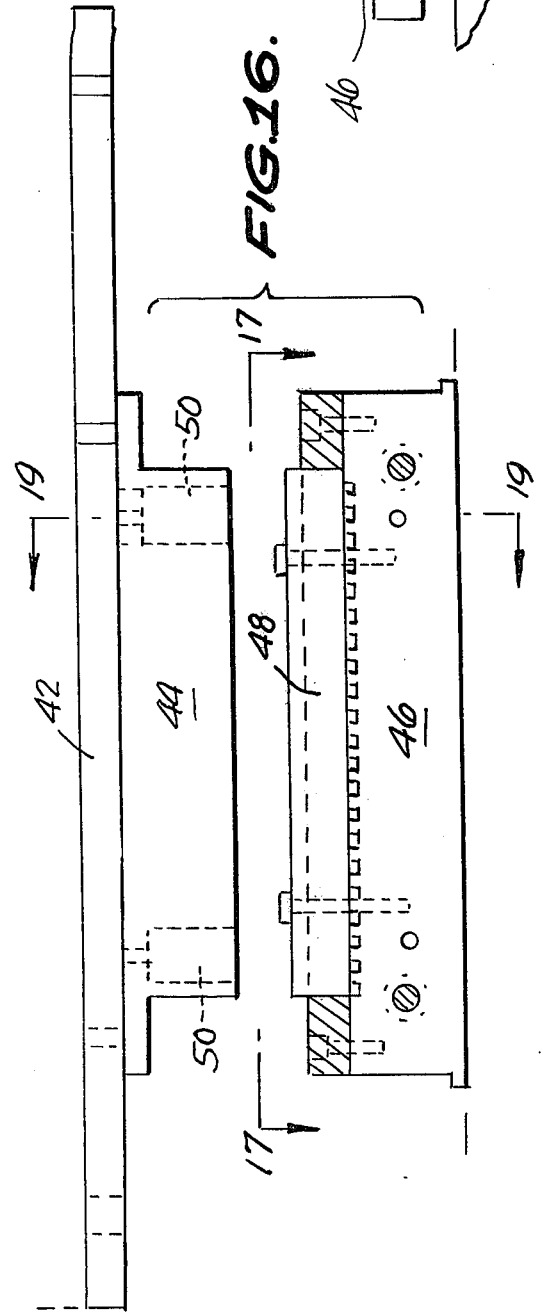
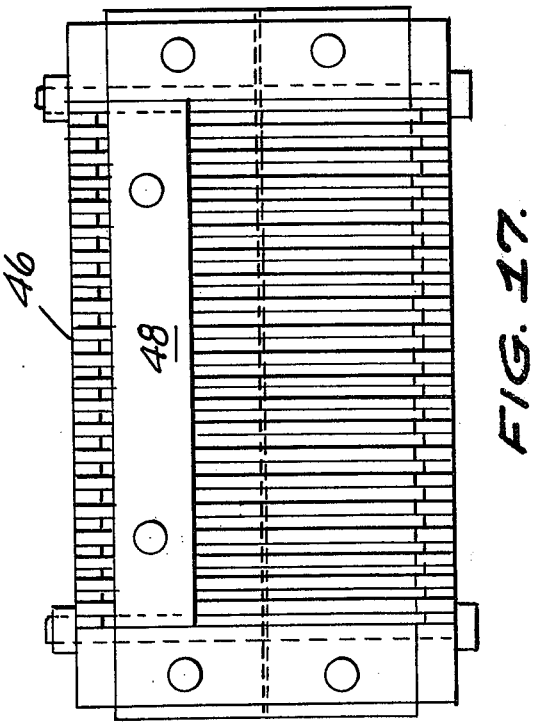

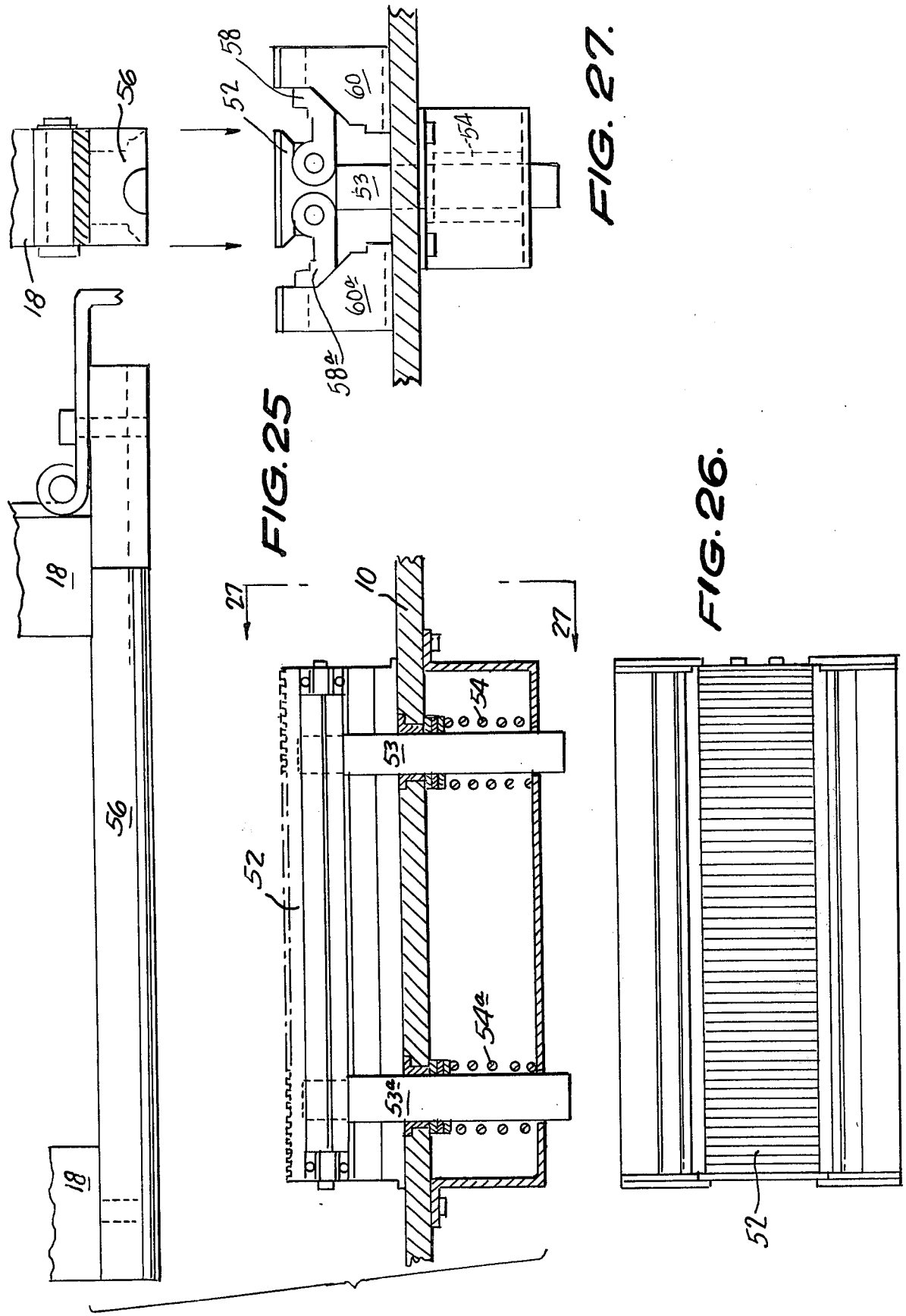

FILE FORMING PRESS

BACKGROUND OF THE INVENTION

1. FIELD OF THE INVENTION

One form of file has its cutting teeth made by stamping the teeth in a flat sheet of metal. The finishing of these files to adapt them for various purposes and to provide for attachment of handles requires that the blank, having teeth already formed in it must be bent and shaped into the desired form.

2. SUMMARY OF THE INVENTION

It is an object of the present invention to provide a press adapted to receive any of many different tools, or dies according to the requirement to make files of specific configurations or to receive and hold a desired handle.

Other objects and advantages will become apparent in the following specification when considered in light of the attached drawings.

BRIEF DESCRIPTION OF THE DRAWINGS

FIG. 8 is an end elevation of an upper one of the file forming dies;

FIG. 9 is a side elevation of the die illustrated in FIG. 8;

FIG. 10 is a bottom plan view of the die illustrated in FIG. 8;

FIG. 11 is a side elevation of an intermediate one of the file forming dies;

FIG. 12 is a transverse sectional view, taken on the line 12—12 of FIG. 11, looking in the direction of the arrows;

FIG. 13 is a top plan view of the die illustrated in FIG. 11;

FIG. 14 is an end elevation of a bottom one of the file forming dies;

FIG. 15 is a side elevation shown partially broken away and in section of the die illustrated in FIG. 14;

FIG. 16 is an exploded front elevation of the upper and lower dies of another file forming die set;

FIG. 17 is a top plan view of the lower die, taken on the line 17—17 of FIG. 16, looking in the direction of the arrows;

FIG. 18 is an end elevation of the structure shown in FIG. 16;

FIG. 19 is a transverse sectional view, taken on the line 19—19 of FIG. 16, looking in the direction of the arrows;

FIG. 25 is a view similar to FIG. 16, of another set of file forming dies;

FIG. 26 is a top plan view of the lower die illustrated in FIG. 25;

FIG. 27 is a transverse sectional view taken on the line 27—27 of FIG. 25, looking in the direction of the arrows;

DESCRIPTION OF THE PREFERRED EMBODIMENTS

Figure 1:
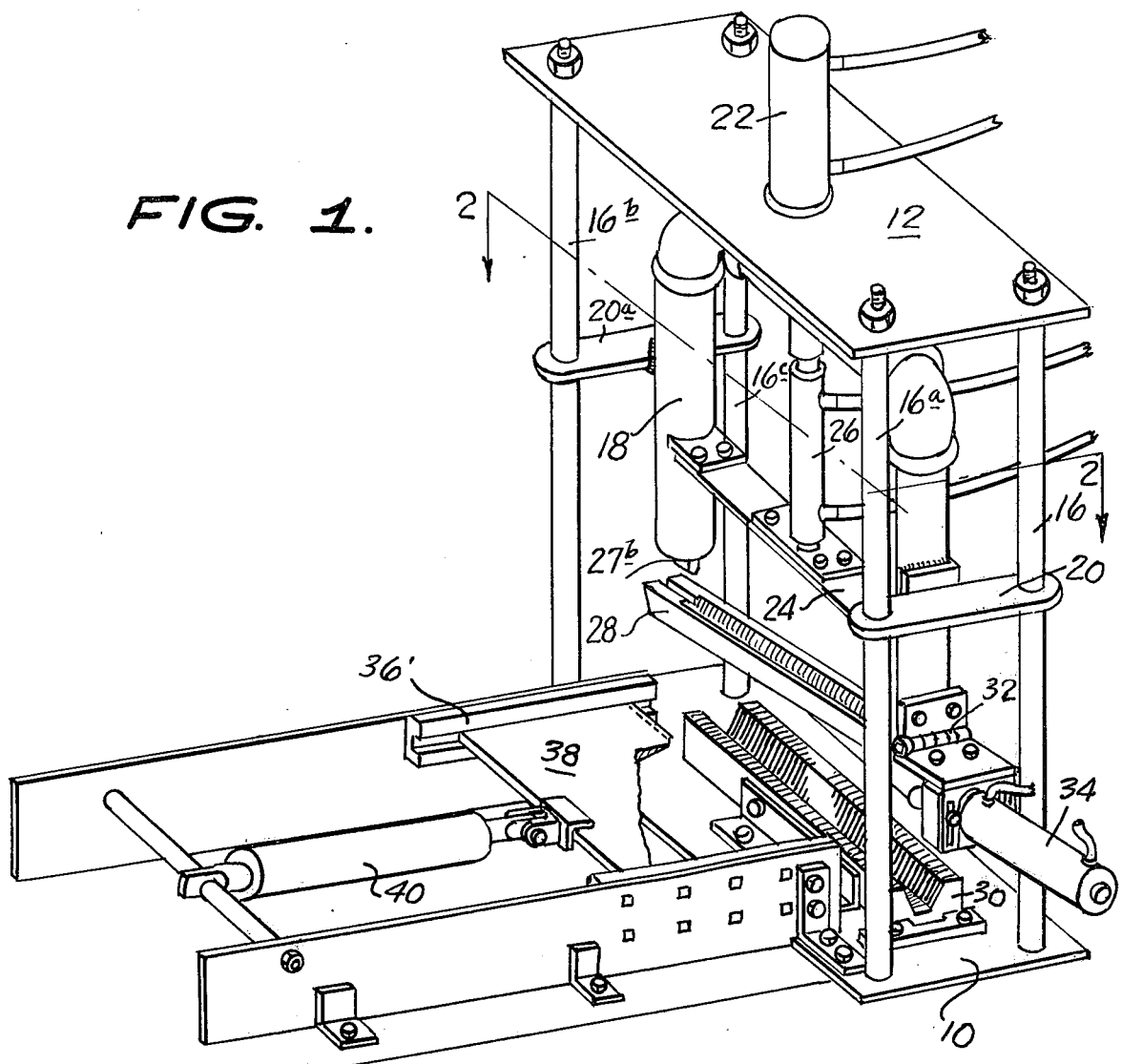
FIG. 1 is a perspective view of the invention, shown partially broken away for convenience of illustration.
Figure 6:
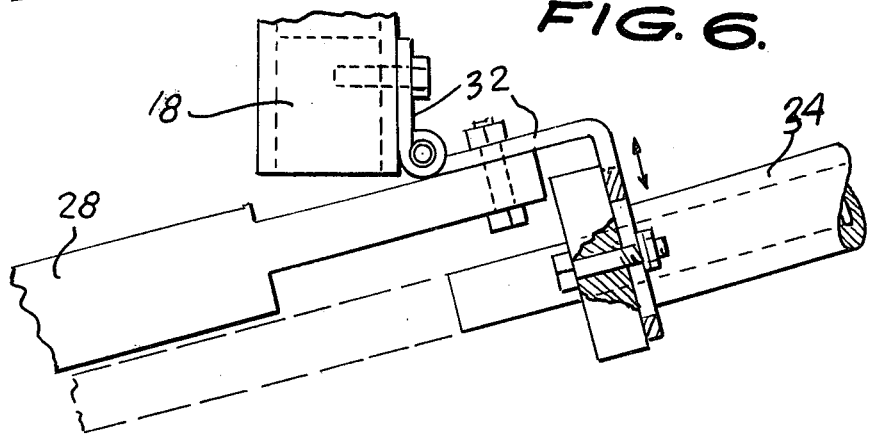
FIG. 6 is a fragmentary detail view taken on the line 6—6 of FIG. 2 looking in the direction of the arrows.
Figure 2:
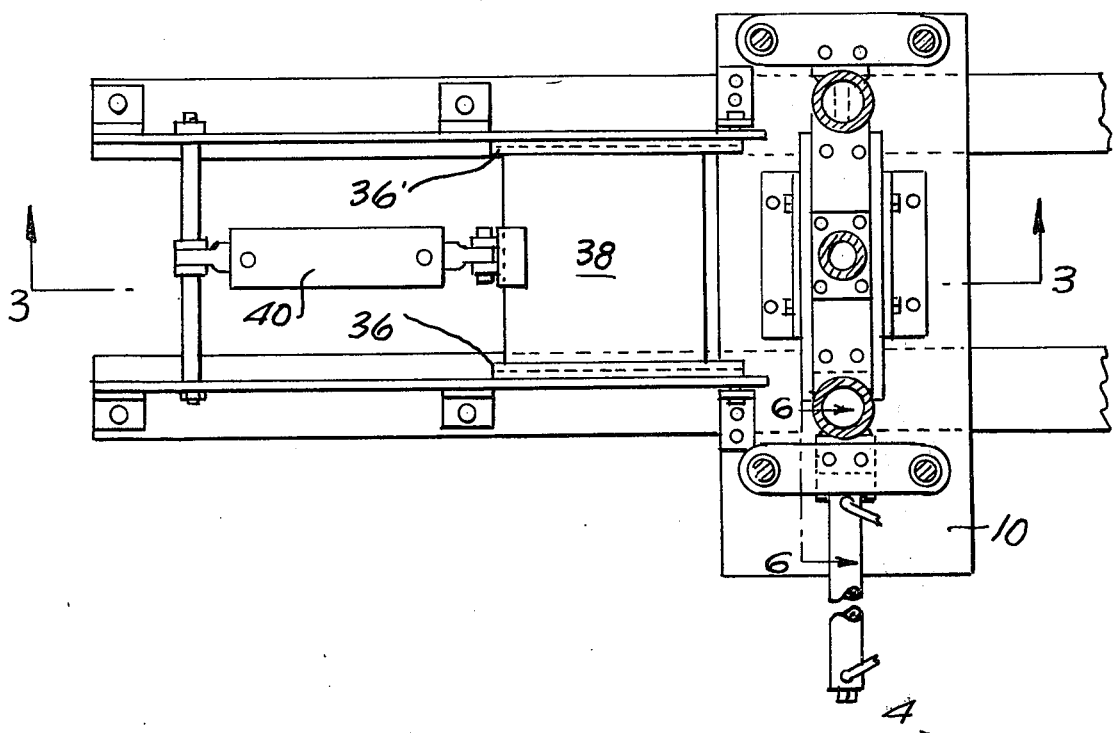
FIG. 2 is a horizontal sectional view, taken on the line 2—2 of FIG. 1 looking in the direction of the arrows.
Figure 3:
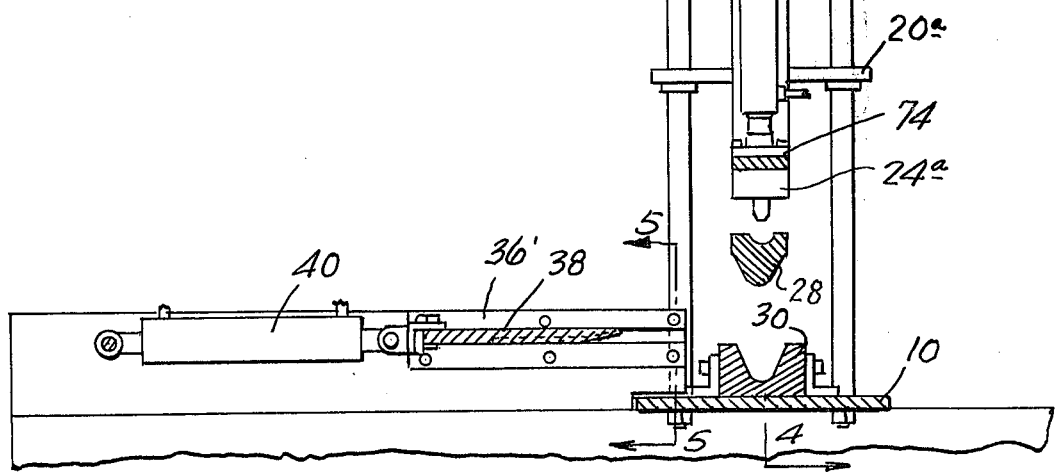
FIG. 3 is a vertical sectional view, taken on the line 3—3 of FIG. 2 looking in the direction of the arrows.
Figure 4:
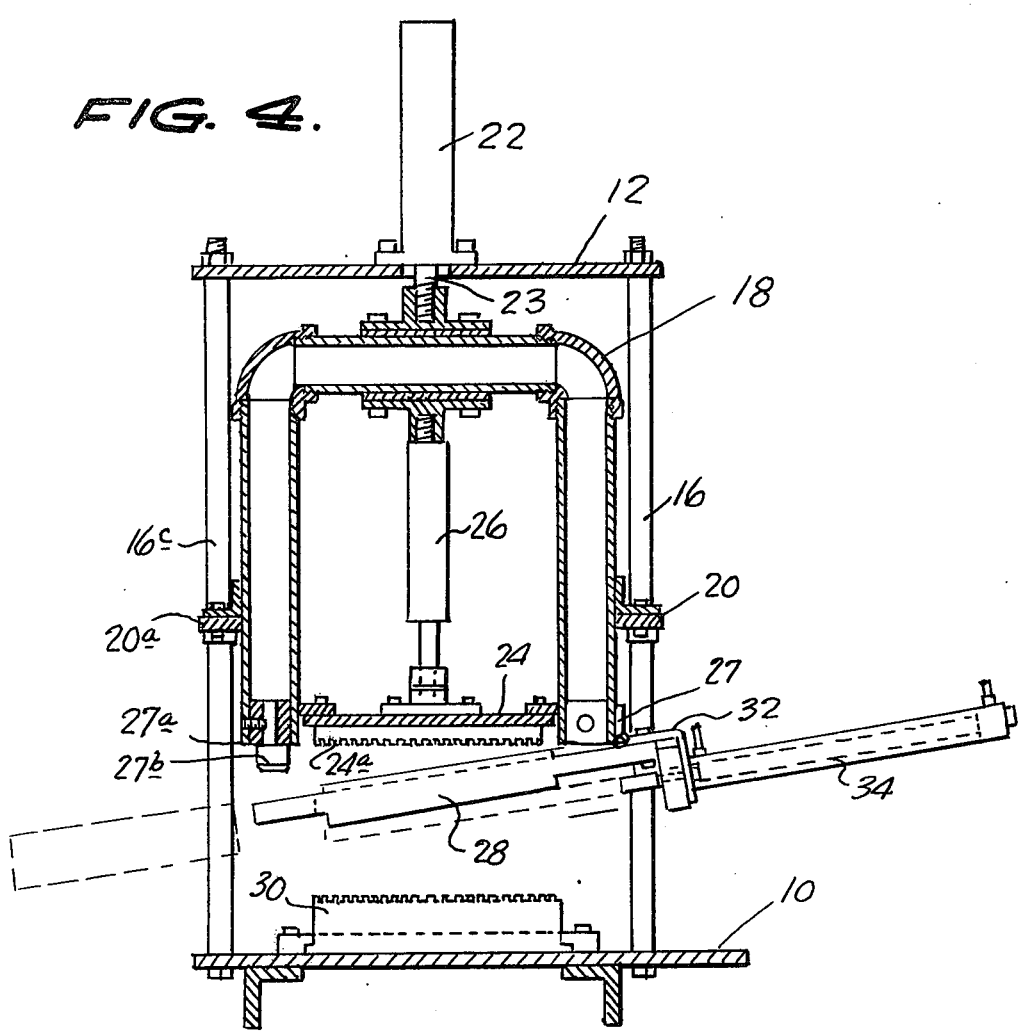
FIG. 4 is a transverse sectional view, taken on the line 4—4 of FIG. 3 looking in the direction of the arrows.
Figure 5:
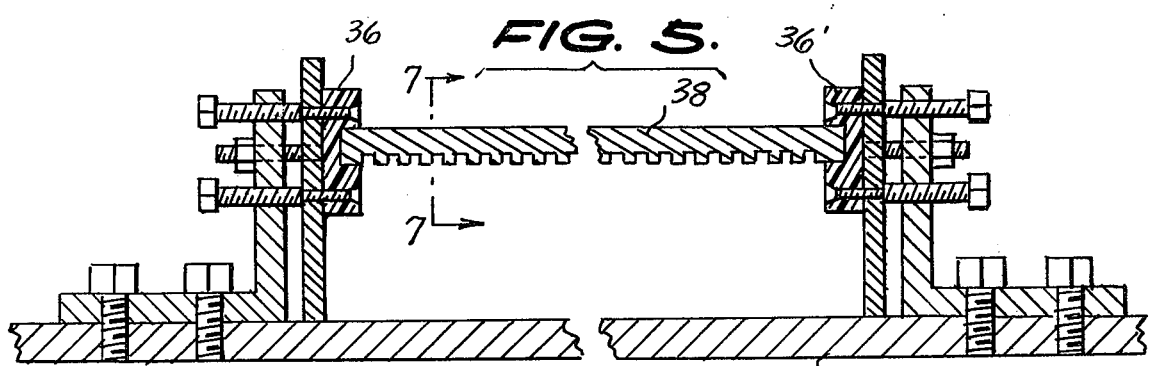
FIG. 5 is an enlarged fragmentary transverse sectional view, taken on the line 5—5 of FIG. 3, looking in the direction of the arrows.
Figure 7:
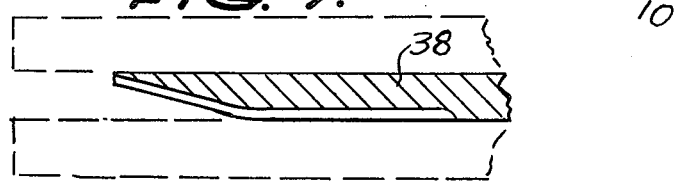
FIG. 7 is a fragmentary longitudinal sectional view, taken on the line 7—7 of FIG. 5, looking in the direction of the arrows.
Figure 23:
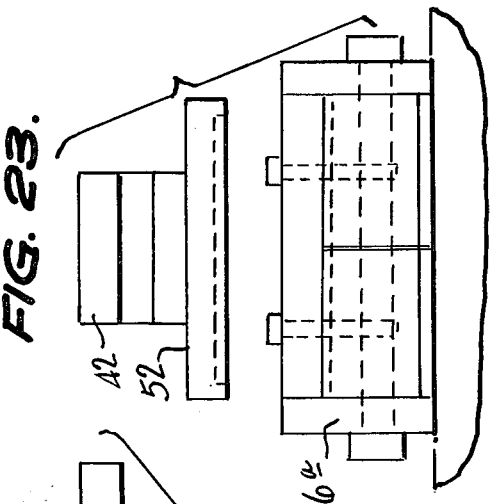
FIG. 23 is an end elevation of the structure illustrated in FIG. 20.
Figure 24:
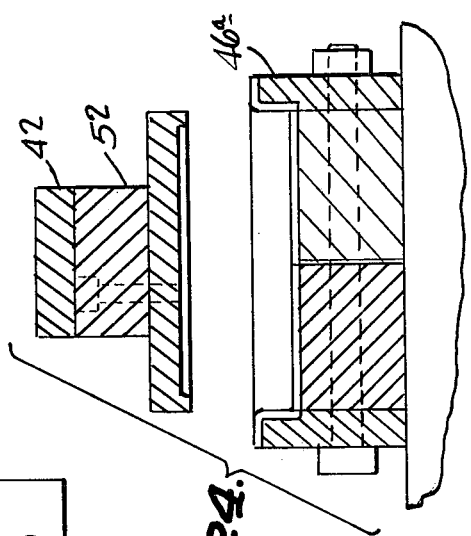
FIG. 24 is a transverse sectional view, taken on the line 24—24 of FIG. 20, looking in the direction of the arrows.
Figure 20:
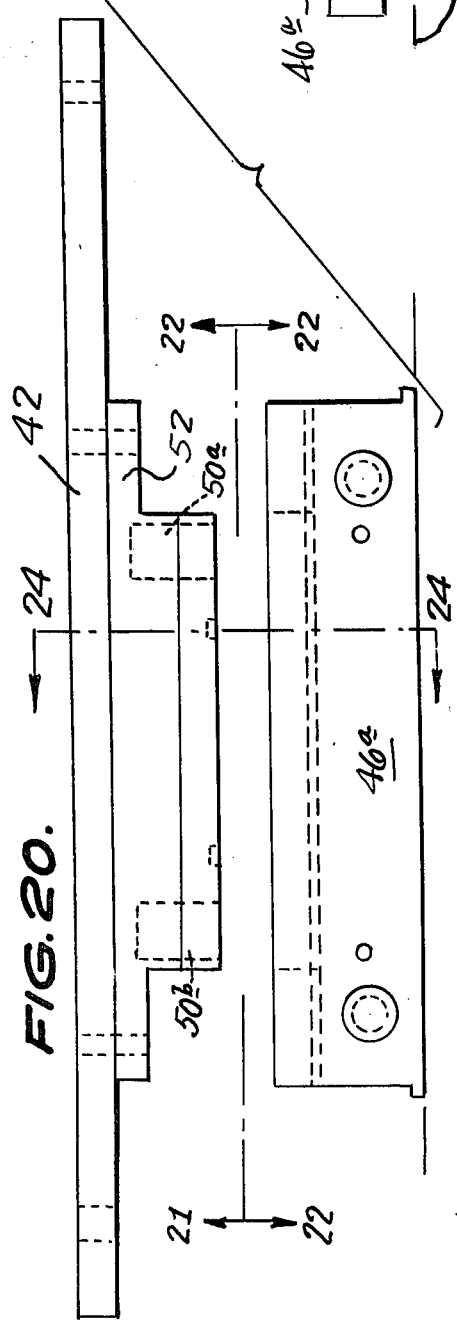
FIG. 20 is a view similar to FIG. 16 of another set of file forming dies.
Figure 21:
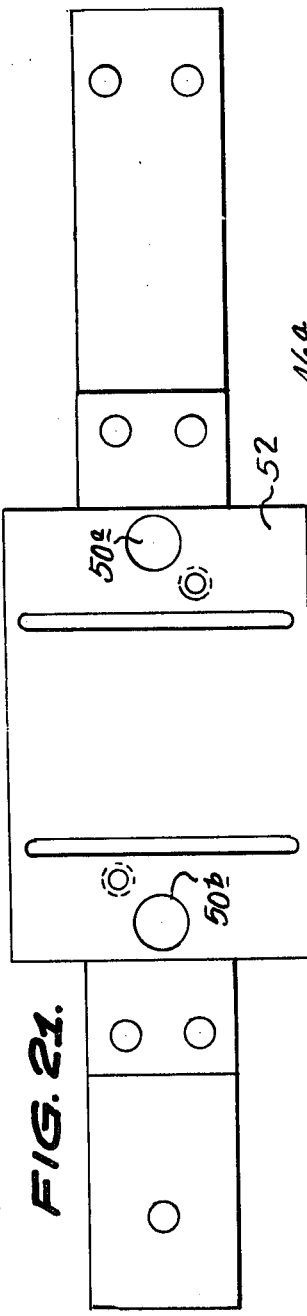
FIG. 21 is a bottom plan view of the upper die, taken on the line 21—21 of FIG. 21, looking in the direction of the arrows.
Figure 22:
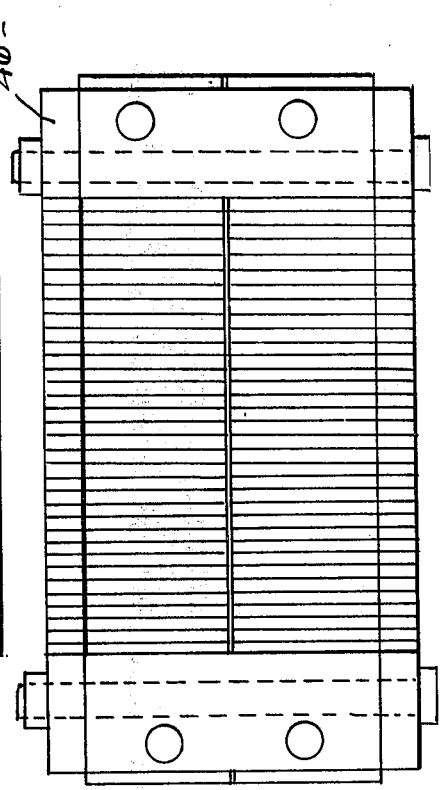
FIG. 22 is a top plan view of the lower die, taken on the line 22—22 of FIG. 20, looking in the direction of the arrows.

In order to make files such as shown for instance in U.S. Pat. No. Des. 216,210 it is necessary to first form the cutting teeth in the sheet metal of which the file is formed. After forming teeth on the file blank no economical method was known by which the toothed blank could be formed into the desired shape. The cost of manufacturing such files was excessive.

As seen in FIGS. 1-6 the press is arranged to make the specific file shown in U.S. Pat. No. Des. 216,210.

The press comprises a base plate 10 and a top plate 12 connected together by columns 16, 16a, 16b and 16c. These columns not only support top plate 12 over bottom plate 10 but also act as guides for the vertically moving elements of the press.

Slidably mounted between columns 16 and 16a on one side, and 16b and 16c on the other is an inverted U-shaped press element 18. Guides 20 and 20a are mounted on element 18 to slide on columns 16, 16a, 16b and 16c.

A hydraulic cylinder 22 and piston means 23 is mounted on upper plate 12 and is operatively connected by piston rod 23 to U-shaped element 18 to raise and lower it and, of course, to develop the necessary pressure to form material in dies, as will be discussed below.

Between the arms of U-shaped element 18, a pressure plate 24 is slidably mounted and is guided by the arms of element 18. Hydraulic cylinder and piston means 26 moves pressure plate 24 upwardly and downwardly with respect to U-shaped element 18. Plate 24 is provided with means to hold a top die element 24a.

The lower ends of the arms of U-shaped element 18 are provided with elements 27 and 27a to provide positive bearing surfaces for an intermediate die element 28. Element 27a may be provided with a tennon 27b to engage and guide element 28 against element 27a.

Bottom plate 10 is provided with means to hold a bottom die 30 in place.

Intermediate die 28 is mounted on a hinge means 32 secured to one arm of U-shaped element 18 adjacent element 27 so that when intermediate die 28 is swung upwardly it will firmly contact press elements 27 and 27a.

A piston and cylinder device 34 is also mounted on hinge means 32 for vertical adjustment with respect to die 28 and is used to push a formed file off of die 28.

To one side of the press described above are two horizontal guides 36, 36' set at right angles to the length of dies 24a, 28 and 30. A bending die or plate 38 having grooves to receive the preformed teeth of a file blank is slidably mounted in guides 36, 36' so as to slide over die 28 after die 28 has been forced downwardly into bottom die 30, and before die 24a is lowered. A hydraulic cylinder and piston means 40 moves bending plate 38 forward and back over die 28. Die 24a is pressed down after bending plate 38 has been advanced, bent the file material over die 28, and been retracted.

The above describes broadly the machine as used to make the specific file of U.S. Pat. No. Des. 216,210 and other hollow files.

Die 24a is seen in detail in FIGS. 8, 9 and 10 and is shaped to define one outside surface of the file. This die is provided with grooves or depressions to receive the preformed file teeth.

Die 28 is seen in detail in FIGS. 11, 12 and 13, and defines the inner shape of the file. This die is longitudinally smooth and transversely shaped to the interior shape desired for the file.

Bottom die 30 is seen in FIGS. 14 and 15, and is shaped to form the other outside surfaces of the file of U.S. Pat. No. Des. 216,210 and is provided with grooves to receive the preformed teeth of the file.

The file blanks are first formed with teeth by forming rows of tangs in a known manner. The dies 30, and 24a are each provided with grooves having lands that will contact the file blank between the teeth. Die 28 has a smooth surface the shape of the interior of the file.

A toothed blank is placed in position on die 30, a portion to be later bent over to form the other side of the file extending from die 30 toward bending plate 38. Piston and cylinder means 22, 23 is actuated and die 28 is pushed down by 27 and 27a to bend the blank down into bottom die 30. Die 24a, meanwhile, is held raised above die 28.

With die 28 pressed into die 30 the blank will have its edge that extends toward bending plate 38 extending upwardly parallel to the side of die 30.

Actuation of piston and cylinder means 40 thrusts bending plate 38 to strike the upwardly extending portion of the blank and the blank will be bent to lie across die 28. It will be noted that bending plate 38 is provided with grooves and lands so that, as bending plate 38 advances, the lands contact the body of the blank and the teeth on the blank are received in the grooves.

Bending plate 38 is then retracted and grooved top die 24a is depressed by piston and cylinder means 26 to form the portion of the blank overlying die 28 into the desired shape.

Dies 28 and 24a are raised to be free of die 30 and die 24a is raised above die 28. Die 28 may then be pivoted downwardly as suggested in FIGS. 1 and 4 and cylinder and piston means 34 are then actuated to push the formed file blank off of the die 28.

While the specific arrangement of cutting teeth on the file blank is not a part of the present invention it will be noted that portions of the blank to be bent at an angle rather than along a curve, do not have teeth, as the teeth along such sharp bends would be destroyed in bending.

Figure 33:
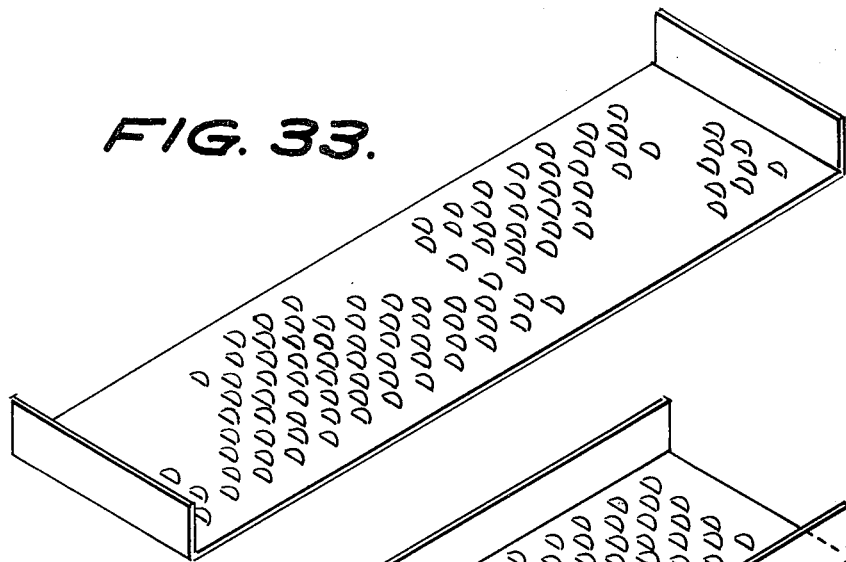
FIG. 33 shows in perspective one file to be formed in the press of FIGS. 1-4 but using different tools.

A second finished file as shown in FIG. 33 is made by using the dies as shown in FIGS. 16, 17 18 and 19.

In FIG. 16 a pressure plate 42 is provided that is to be secured in position on hinge 32 in lieu of die 28 so as to be pressed downwardly by ends 27 and 27a of U-shaped element 18.

A smooth surfaced male die 44 is mounted on pressure plate 42 and a grooved female die 46 is mounted on base plate 10. Female die 46 may be wider than the file being shaped in the press. A positioning or filler block 48 is provided which may be mounted within female die 46. The female die 46 with its filler block 48 is positioned under male die 44 so that die 44 just clears block 48.

Electromagnets 50, 50' are mounted in male die 44.

The operation of the press to form the files of FIG. 33 is as follows: A flat blank with the cutting teeth formed in it has a portion with no teeth on the two end portions that extend beyond the ends of the cavity of female die 46. Hydraulic piston and cylinder means 22, 23 is operated to push male die 44 into female die 46, the ends of the toothed blank are then bent upwardly as the die 44 descends. Electromagnets 50 and 50' provide strength. The female die 46a used to form the file of FIG. 34 may be the same as the die 46 seen in FIGS. 16, 17, 18 and 19.

In FIGS. 20 through 24 a male die 52 is mounted on pressure plate 42 in lieu of die 44, and a female die 46a is mounted on bottom plate 10 in position to receive die 25. Male die 52 is provided with grooves on its bottom surface to receive the strengthening ridges on the back of the finished file.

Male die 52 is provided with electromagnets 50a and 50b that perform the same as electromagnets 50 and 50'.

Figure 34:
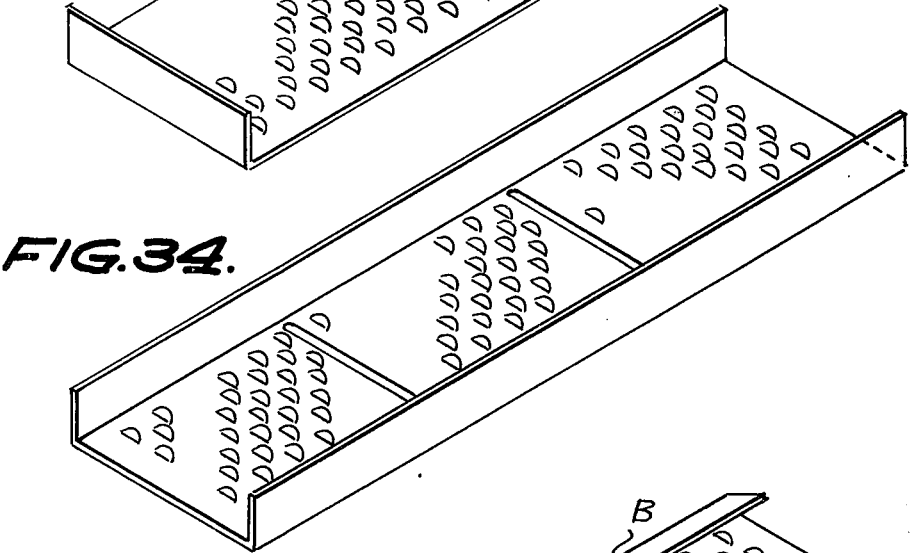
FIG. 34 shows in perspective one file to be formed in the press of FIGS. 1-4 but using different tools.

The blank to form the file of FIG. 34 is placed on female die 46a with its edges extending over the sides of female die 46a. Male die 52 is depressed and thrusts the blank into female die 46a. Electromagnets 50a and 50b are energized and male die 52 is lifted bringing the formed file with it. When the electromagnets 50a and 50b are deenergized the formed file falls away and is thrust to one side as it falls by actuation of cylinder and piston means 34.

Female dies 46 and 46a are provided with transverse grooves into which the teeth project as the blank is depressed against the lands between the grooves.

It is seen then that die 46a used with a filler block 48 is die 46. It is seen then that a single female die may be used to shape many different files.

Figure 35:
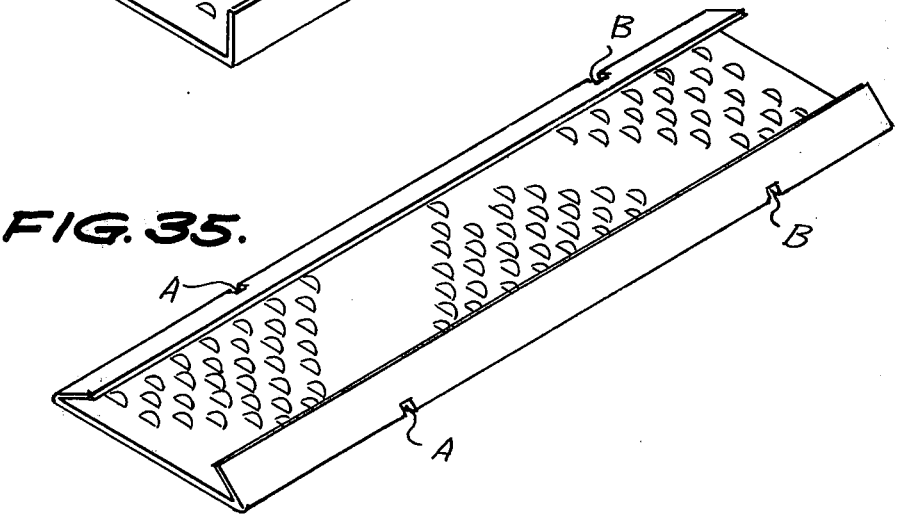
FIG. 35 shows in perspective one file to be formed in the press of FIGS. 1-4 but using different tools.

The file of FIG. 35 may also be formed from a flat blank with prestruck teeth in the same press. In this case, as shown in FIGS. 25 to 32, a female or lower die 52 mounted on vertically slidable posts 53, 53a is provided and is pressed upwardly by springs 54 and 54a.

This die has a generally planar top grooved to receive the previously struck out teeth on the blank.

Fastened to the ends of element 18 is a male or upper die 56 having a face complementary to the upper face of female die 52, but the edges sloping inwardly to form outwardly extending toe portions. It will be noted that the faces of dies 52 and 56 may be somewhat curved to form a convex or a concave face on the file if desired.

Pivoted on die 52 on each side are L-shaped bending bars 58 and 58a parallel to the die. These bending bars are pivoted at the end of the stem of the L so that the foot of the L will swing upwardly over the outwardly extending toe portions of die 56.

Figure 28:
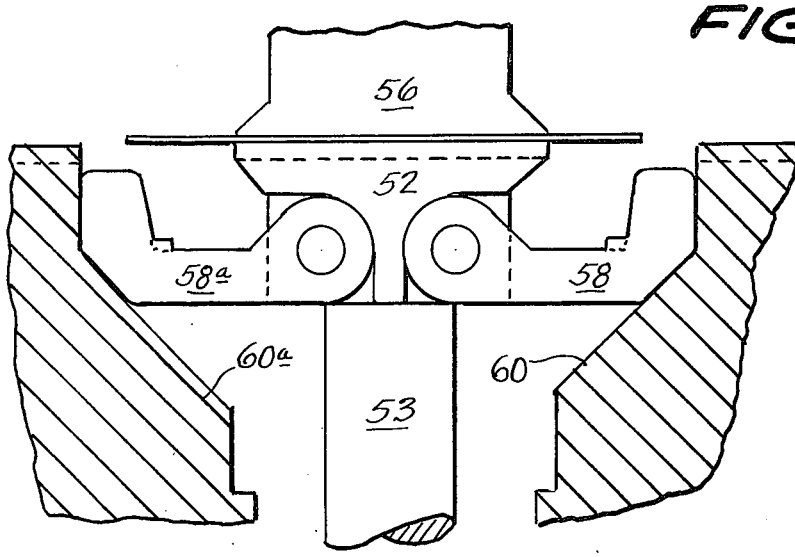
FIG. 28 is an enlarged view similar to FIG. 27 with the elements in an advanced position.

Bending bars 58 and 58a, when the die 52 is in its elevated position as seen in FIGS. 27 and 28, rest on cam blocks 60, 60a which are mounted on base plate 10.

Figure 31:
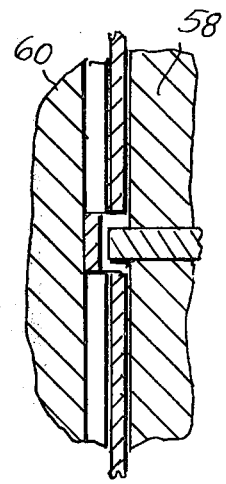
FIG. 31 is an enlarged fragmentary transverse sectional view, taken on the line 31—31 of FIG. 30, looking in the direction of the arrows.

It is desired to form inwardly extending tabs in the bend of the file as seen at A and B in FIG. 35. To accomplish this set screws with blunt noses 62, 62a forming projections into the inner angle of die L extend through bending bars 58 and 58a located so that, as seen in FIG. 31 the end of the set screw strikes and bends inwardly precut tabs in the file where it is bent about the toe of die 56. A locking set screw may be provided to avoid the possibility of set screw 62 backing off and so becoming inoperative.

Figure 32:
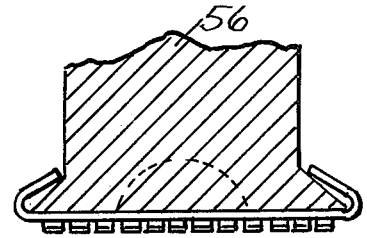
FIG. 32 is a transverse sectional view of the upper die illustrated in FIG. 27 with the completed file attached.
Figure 29:
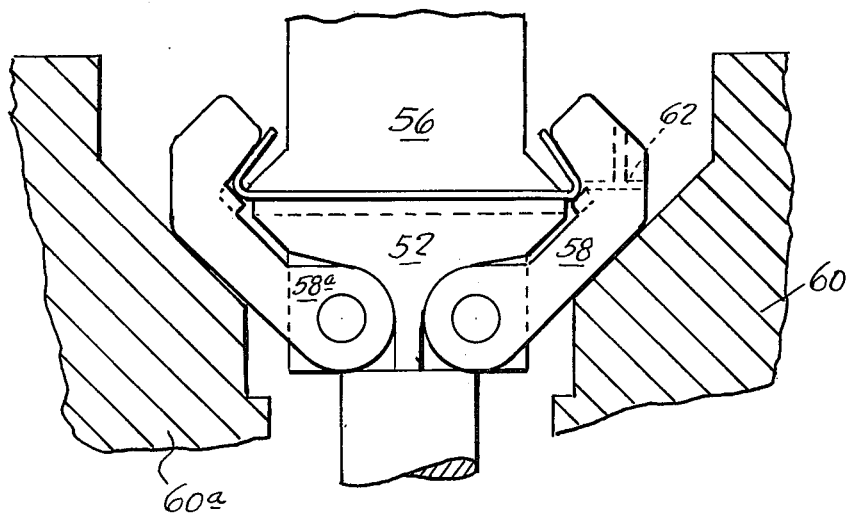
FIG. 29 is a view similar to FIG. 28 with the elements in a further advanced position.
Figure 30:
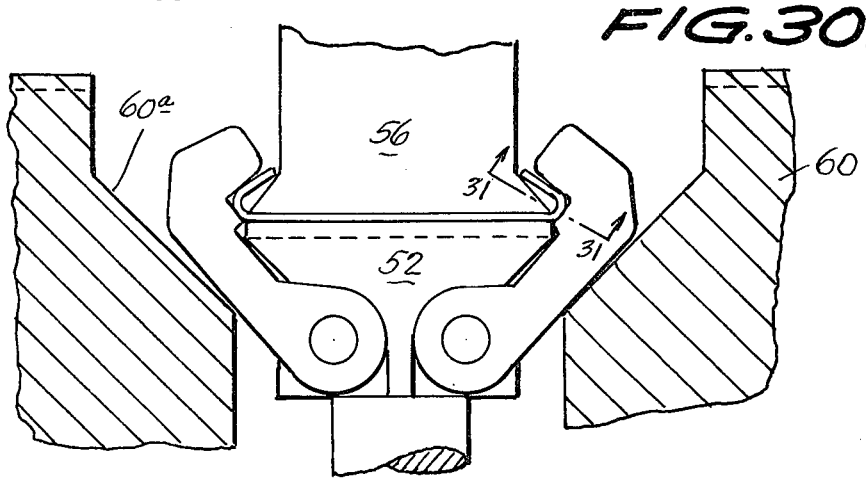
FIG. 30 is a view similar to FIG. 29 with the elements in a further advanced position.

The operation of the press to form the file shown in FIG. 35 is clear from FIGS. 28, 29 and 30. The file blank is supported on die 52 with its teeth in the grooves thereof, so as not to be damaged; die 56 is pressed downwardly by activation of cylinder and piston means 22, 23 (FIG. 4) so that element 18 forces die 52 to first engage the blank then to depress the die 52 between bending blocks 60 and 60a so that the bending bars 58, 58a swing upwardly to fold the edges of the blank upwardly and inwardly over the toes of die 56. It will be noted that bending bars 58, 58a do not bend the blank edges tight against the fairly sharp edges of the toe portions of die 56. The bend of the blank is, therefore, rather rounded as seen in FIG. 32. As seen in FIG. 31 the set screws 62, 62a etc. extend into the curve of the file blank so as to bend a precut tab inwardly as seen at A or B in FIG. 35.

After the die 56 has depressed die 52 to its full extent as shown in FIG. 30, the die 56 is raised, springs 54 forcing die 52 to follow die 56 upwardly. Bending bars 58 and 58a fall away and the file, due to the resiliency of the file material is found to be loose on die 56 but retained by the outwardly extending toes. Cylinder 34 is then actuated and the formed file is ejected to one side of the press.

It will be noticed that when using the press to form the files of FIGS. 33, 34 or 35 the pressure plate 24 may be depressed to support the central portion of dies 42, 44 or 42, 52 and, in making the file of FIG. 35, pressure plate 24 may support die 56.

Having thus described the preferred embodiments of the invention it should be understood that numerous structural modifications and adaptations may be resorted to without departing from the spirit of the invention.

What is claimed is:

1. A file forming press for bending toothed file blanks into their final form comprising; a base plate adapted to support a die and a top plate, means connecting said top and bottom plates, an inverted U-shaped vertically movable press element presenting downwardly extending arms and having pressing surfaces at the lower ends of said arms, hinge means secured at the lower end of one arm of said inverted U-shaped element, a die supported by said hinge so as to be normally in firm contact with said pressing surfaces, said hinge permitting said die to be pivoted downwardly away from the pressing surface remote from said hinge, a hydraulic piston and cylinder means operatively connecting said inverted U-shaped press element to said top plate adapted to lower and raise said inverted U-shaped press element from a lowermost to an elevated position, a pressure element including means to support a die mounted between and guided by the arms of said inverted U-shaped press element, a die mounted on said pressure element, a hydraulic cylinder and piston means mounted on said U-shaped press element connected to said pressure element to move said pressure element with respect to said U-shaped press element whereby said die mounted on said press element may be pressed against said die supported by said hinge, cylinder and piston rod means adjustably mounted on said hinge whereby said piston rod may be aligned with the said die mounted on said hinge, a die mounted on said base plate to cooperate with said die mounted upon said hinge, horizontal guide means mounted on one side of said base plate, a slidable bending plate mounted for horizontal movement in said guide means, and hydraulic cylinder and piston means operative to move said bending plate over said die supported by said inverted U-shaped press means when said die supported by said press means is in its lowermost position engaging said die mounted on said base plate.

2. A die set for forming geometrically shaped hollow files from a blank of toothed sheet material comprising an elongated lower generally U-shaped die formed with grooves to receive the teeth of said blank, an intermediate smooth surfaced die having a lower surface complementary to the generally U-shaped lower die, and having an upper longitudinally smooth surface, a die in the form of a bending plate to bend a portion of the blank over the upper surface of said intermediate die, and a top die provided with grooves to receive the teeth of a blank and having a transverse configuration complementary with the transverse configuration of the upper surface of said intermediate die.

3. A die set for forming generally flat files with either turned up ends or turned up edges from file blanks having pre-cut teeth thereon, said die set comprising a bottom female die provided with grooves to receive said pre-cut teeth and a top male die having smooth surfaces and electromagnet means mounted in said male die to lift a formed file from said female die, said top male die having outwardly extending toe portions along its sides, and the bottom female die having pivoted L-shaped bending bars parallel with the toe portions and mating therewith to bend the edges of the file blank upwardly and inwardly.

4. The die set of claim 3 including a filler element to position a narrow file blank in said female die.

5. The die set of claim 3 in which said male die is provided with recesses in its surface to receive upwardly extending portions of a file blank.

6. A die set for forming a file from a blank having preformed cutting teeth comprising an elongated lower die grooved to receive the preformed teeth of a file blank, a smooth surfaced upper die complementary to said lower die having its longitudinal edges adjacent the edges of said lower die sloping upwardly sharply away from said edges to provide toe portions adjacent the edges of said lower die, L shaped bending bars extending the length of said lower die and pivoted to the under side of said lower die at the ends of the stems of the L shaped bars so that when swung upwardly about the pivots the foots of said L shaped bars will be swung upwardly and inwardly to overlie the toe portions of said upper die, and stationary cam means below said lower die positioned to force said L shaped bars to pivot upwardly and inwardly when said lower die is depressed by pressure on said upper die, whereby the edges of a blank held between said upper and lower dies will be bent upwardly and inwardly over the toe portions of said upper die.

7. The die set of claim 5 in which at least one tab forming projection is provided extending inwardly into the inner angle of the L shaped bars to contact and bend inwardly a precut tab in the blank as it is bent over said toe portions of said upper die.

8. The die set of claim 7 in which said tab bending projection is a set screw adjustably mounted in said L shaped bar.

* * * * *